Jan. 14, 1958
A. J. KOSCH
2,819,778
STEERING AID FOR VEHICLES
Filed Dec. 18, 1953
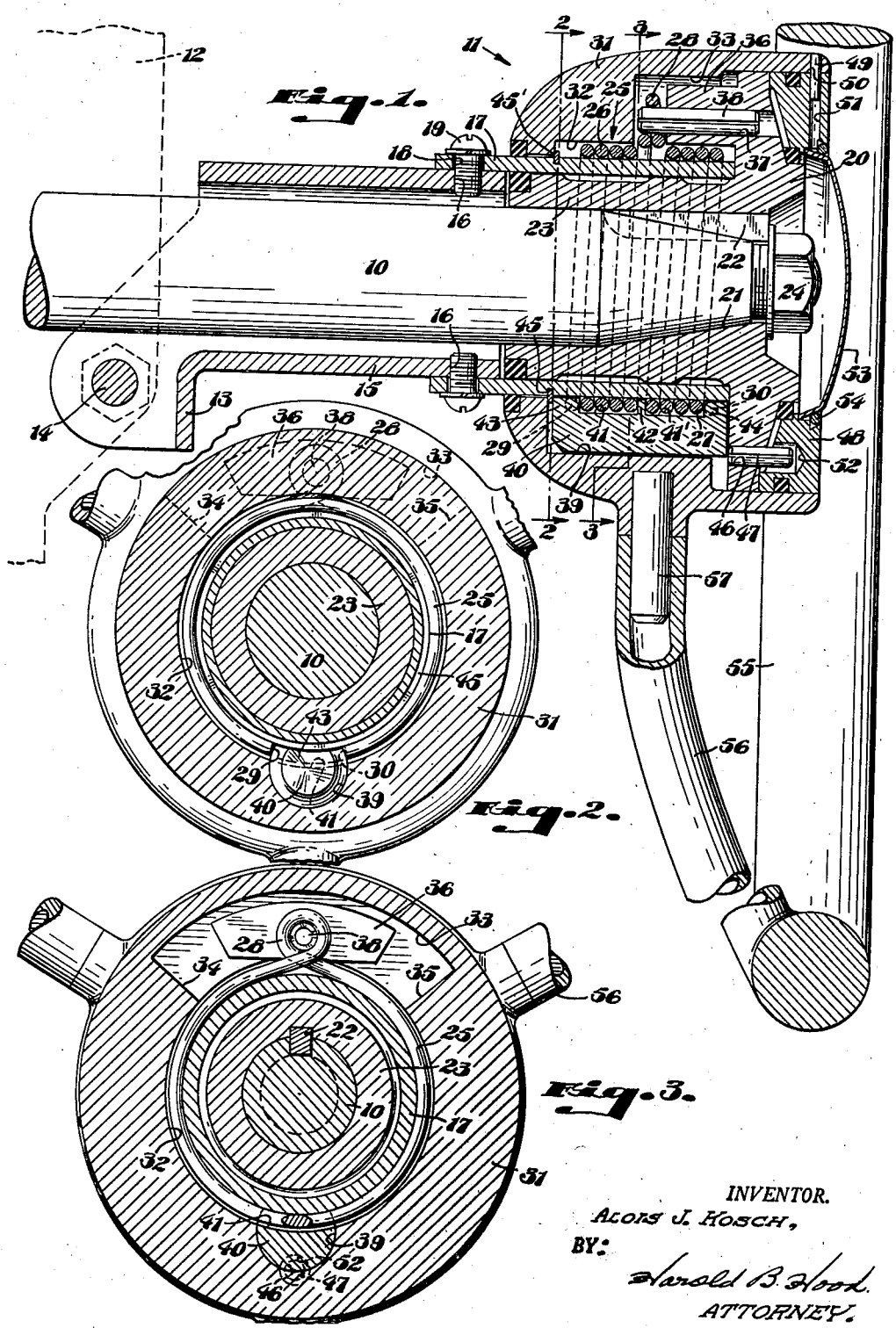
INVENTOR.
ALOIS J. KOSCH,
BY:
Harold B. Hood.
ATTORNEY.

United States Patent Office 2,819,778
Patented Jan. 14, 1958

2,819,778
STEERING AID FOR VEHICLES

Alois J. Kosch, Columbus, Nebr., assignor to Kosch Co., Columbus, Nebr., a corporation of Nebraska Application December 18, 1953, Serial No. 398,927

10 Claims. (Cl. 192—8)

The present invention relates to a steering aid for vehicles, and is primarily concerned with the provision of means, readily associable with a conventional steering post of such a vehicle, for preventing the transmission of road shock to the conventional manually-manipulable steering element of the vehicle.

The invention is primarily useful in the steering systems of farm or military or construction vehicles which must be driven over rough terrain, and usually at relatively low speeds. In driving a wheeled tractor over a plowed field, for instance, when the dirigible wheels strike a furrow or a hummock at an angle, they tend to twist in one direction or the other, and that tendency is transmitted, through a steering post, to the conventional steering wheel, where it must be resisted by the vehicle operator, if the vehicle is to be held substantially to a true course. My invention contemplates means whereby any such tendency is mechanically resisted and absorbed before it reaches the manually-manipulable steering element.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a longitudinal, substantially central section through a steering aid constructed in accordance with my present invention, and showing a preferred form thereof;

Fig. 2 is a transverse section taken substantially on the line 2—2 of Fig. 1; and Fig. 3 is a similar section taken substantially on the line 3—3 of Fig. 1.

Referring more particularly to the form of the invention selected for illustration, the reference numeral 10 indicates a conventional steering post with which the steering aid of the present invention, indicated generally by the reference numeral 11, may be associated. To any convenient portion 12 of the vehicle, adjacent the steering post, a bracket 13 is fixedly secured by means of one or more bolts 14 or other suitable fastening means. The bracket 13 embodies a tubular shank 15 which substantially coaxially surrounds an upper portion of the steering post 10, and which is preferably provided, adjacent its distal end, with a series of perforations 16 peripherally spaced about the bracket shank. In the illustrated embodiment of the invention, the perforations 16 are tapped for a purpose to become apparent.

A drum element 17, preferably formed adjacent one end with a corresponding series of perforations 18, has that end sleeved on the distal end of the bracket shank 15 and secured thereto by means of screws 19, or other equivalent fastening means. The drum 17 surrounds the distal end portion of the steering post 10, and is preferably made removable from the bracket 13. Brackets of various sizes and shapes may be substituted, of course, for the particular bracket shown in order to accommodate the device to various specific forms and arrangements of steering post, as encountered in various makes of vehicles.

A shell or mandrel member 20 is formed with an axially-extending socket 21 for mounting upon the distal end portion of the steering post 10. In the illustrated embodiment of the invention, the end of the steering post and the socket 21 are tapered, as shown, and a key 22 is received in mating keyways in the post and in the member 20 to provide the necessary non-rotational connection between the steering post and the element 20. Preferably, the element 20 has an extended, cylindrical shank portion 23 which has a rotational bearing within the drum 17. Means may be provided, for instance as disclosed in my co-pending application Serial No. 343,126 filed March 18, 1953 for Vehicle Steering Aid, whereby the assembly of the present disclosure may be adapted for mounting upon steering posts of various designs. In the illustrated embodiment of the invention, the member 20 is secured against removal from the post 10 by means of a nut 24 threadedly mounted on the extremity of the steering post and bearing upon an end surface of the member 20.

A spring 25, wound as a substantially cylindrical spiral, is sleeved on the external surface of the drum 17. Preferably, the spring 25 is so proportioned and designed that, when in equilibrium, the internal diameter of the spiral is slightly less than the external diameter of the drum 17 so that, when the spring is sleeved on the drum, said spring frictionally grips the surface of the drum.

In the illustrated embodiment of the invention, the opposite end portions 26 and 27 of the spring 25 are set off from each other by the fact that, at a point substantially midway between the ends of the spiral, the spring is formed to define a loop 28, radially offset beyond the external surface of the spiral, upon an axis substantially parallel with the axis of the spiral, for a purpose which will later become apparent. The spring is, of course, wound in the same direction from end to end, so that its termini 29 and 30 face in opposite directions, peripherally. Additionally, the spring is so proportioned and designed that said termini are slightly peripherally spaced from each other when the spring is mounted on the drum 17. It will be noted that the terminus 30 of the spring is indicated in dotted lines in Fig. 1, though the plane of that figure is actually spaced somewhat to the left of said spring terminus 30, as viewed in Figs. 2 and 3.

A hub 31 is mounted for rotation about the axis of the drum 17, and preferably, said hub is axially journalled on said drum in the manner illustrated. Said hub is formed with an internal surface 32 which closely surrounds the spiral spring 25 from end to end, except that said surface 32 is interrupted to define a radially enlarged pocket 33 whose peripheral extent is less than 180° (approximately 90° in the illustrated embodiment) and whose axial depth is somewhat greater than one-half the length of the spiral defined by the spring 25. Said pocket 33, of course, accommodates the radially offset loop 28 of the spring 25; and the end walls 34 and 35 of the pocket 33 are peripherally spaced a distance sufficient to accommodate a tongue or finger 36, integral with the member 20, and projecting axially into the pocket 33 to a point closely adjacent the loop 28. Said finger is formed with an axially-extending bore 37 in which is mounted a member 38. Said member 38 is preferably a hollow, split, cylindrically formed pin with chamfered ends, whose relaxed diameter slightly exceeds the diameter of the bore 37 so that, when said pin is driven into the bore, it is resiliently fixedly retained therein by its inherent tendency to expand. The projecting portion of the pin 38 is similarly engaged in the loop 28, whose internal diameter is substantially the same as that of the bore 37. Devices of the type just described are commercially known as "Roll-pins." Of course, any other form of means for providing a driving connection between the element 20 and the intermediate portion of the spring 25 may be used, though that which has just been described is presently deemed to be optimum.

The surface 32 of the hub 31 is further interrupted by a socket 39 in which is received a key 40. The key 40 is formed with a transverse channel 41, flush with the surface 32, for the accommodation of the end portion 26 of the spring 25, said channel being preferably separated, by a wall 42, from a similar channel 41' accommodating the end portion 27 of the spring 25. The wall 42 lies substantially in the plane of the loop 28. At one end, the key 40 is formed to define an abutment 43 against which bears the terminus 29 of the spring 25; and at its other end, the key defines an abutment 44 against which bears the terminus 30 of the spring 25. The relationship between the key 40 and the spring 25 is perhaps most clearly illustrated in Fig. 2.

The drum 17 is formed with an annular groove 45 in which is received a spring ring 45'. The hub 31 bears against one face of the ring 45' and is thereby retained against removal from the drum; and the key 40 bears against the opposite face of said ring.

The flange at the outer end of the member 20 is formed with a bore 46 in which is supported a pin 47. A closure member 48, received in the outer end of the hub 31 and secured thereto, in the illustrated embodiment of the invention, by one or more pins 49 seated in registering bores 50 and 51 in the hub and in the closure member, is formed with a socket 52 into which the projecting end of the pin 48 extends. The peripheral dimension of the socket 52 somewhat exceeds that of the pin 47 in order to provide a lost-motion, rotational driving connection between the hub 31 and the member 20. The shell or mandrel member 20, being rotationally fixed to the steering post 10 and having a lost-motion driving connection with the hub 31, may sometimes be referred to as an "intermediate member."

In the illustrated embodiment of the invention, the closure member 48 is annular; and a cap or cover member 53 is mounted within the inner periphery of said member 48 to house the nut 24, said cover being secured in place, for instance, by a spring ring 54.

The hub 31, of course, carries a manually-manipulable element such as the steering wheel 55 which, in the illustrated embodiment of the invention, is provided with spokes 56 secured to the hub 31 by means of pins 57.

It will be seen, particularly from inspection of Figs. 2 and 3, that the spring portions 26 and 27 normally frictionally grip the drum 17. If an external force is transmitted from the dirigible wheels of the vehicle through the steering post 10, tending to turn said post in a clockwise direction as viewed in Fig. 2, that force will be transmitted, through the intermediate member 20 and the pin 38 to the loop 28 of the spring 25. Obviously, any tendency of the loop 28 to move in a clockwise direction will wrap the portion 26 of the spring 25 more tightly upon the drum 17; and the frictional engagement between said portion 26 and said drum will hold the pin 38 (and so the intermediate member 20 and the post 10) against any substantial clockwise movement.

Similarly, any tendency of the pin 38 to move the loop 28 in a counterclockwise direction will tend to wrap the portion 27 of the spring 25 more tightly about the drum 17, whereby any such tendency will be overcome. The parts are so proportioned and designed that movement of the intermediate member 20 in either direction, under the influence of a force exerted through the steering post 10, will be arrested before the pin 47 has come into engagement with a wall of the socket 52. Thus, all shocks are restrained from transmission to the steering wheel 55.

However, if the vehicle operator exerts a force upon the steering wheel tending to turn the hub 31 in a clockwise direction, as viewed in Fig. 2, the hub will turn through a small angle before the wall of the socket 52 comes into engagement with the pin 47; and as the hub so turns, the key 40, acting upon the terminus 29 of the spring portion 26, will exert an unwrapping force upon said spring portion. I have found that the surface 32 should preferably be spaced very slightly beyond the normal external periphery of the cylindrical spiral. If said surface 32 closely overlies the spring, the outermost turn of the spring portion 26 will be prevented from moving radially outwardly to any large degree, and the unwrapping tendency will therefore be transmitted throughout the spiral length of the portion 26 to shift all of the turns of that portion out of frictional engagement with the drum 17 before the wall of socket 52 engages pin 47. If, however, the surface 32 is too widely spaced from the external surface of the drum 17, it sometimes happens that one or two turns of the spring portion 26 will expand sufficiently to absorb all of the unwinding tendency, and the remaining turns of said spring portion may retain some or all of their frictional engagement with the drum surface. For optimum results, the surface 32 should be radially spaced from the external surface of the drum 17 just sufficiently so that, when the righthand wall of the socket 52 engages the pin 47, all of the turns of the spring portion 26 will be engaged with the surface 32. In any event, the radial distance between the external surface of the drum 17 and the surface 32 should not exceed twice the radial thickness of the spring 25.

After the spring portion 26 has thus been expanded out of frictional engagement with the drum surface, the engagement of the wall of the socket 52 with the pin 47 will entrain the intermediate member 20 with the hub 31, and further movement of the hub 31 in the same direction will carry with it the pin 38 and the spring loop 28. It will be clear that clockwise movement of the spring loop 28, as viewed in Figs. 2 and 3, tends to unwrap the spring portion 27 from the drum 17; whereby the member 20 will be released for free rotation relative to the drum 17, with the wheel 55.

Similarly, if the wheel 55 is turned in a counterclockwise direction as viewed in Figs. 2 and 3, the key 40 first unwraps the section 27 of the spring 25, the member 48 then picks up the member 20, and counterclockwise movement of the loop 28 will unwrap the section 26 of the spring 25.

Thus it will be seen that, so long as the operator does not exert any turning force upon the steering wheel 55, the steering gear will be positively held in any position of adjustment, against any deflecting forces which may be exerted upon the dirigible vehicle wheels as they encounter obstacles or roughness in the surface being travelled. Nevertheless, no substantial resistance is encountered when the operator exerts a turning force upon the steering wheel 55. It may be noted that, as the operator exerts such a force upon the steering wheel, any external force impressed upon the vehicle wheels in the direction in which the operator seeks to turn them will be transmitted in aid of the operator's effort, while any external force opposing the operator's effort will be absorbed in the mechanism above described.

I claim as my invention:

1. In a device of the class described, a stationary drum, a continuous spring wound on the external surface of said drum as a substantially cylindrical spiral, a hub mounted for rotation about the axis of said drum and having an internal surface closely surrounding said spring, said surface being interrupted by a pocket having an angular extent of less than 180° and an axial depth slightly greater than one-half the length of said cylindrical spiral, means moving with said hub and disposed in peripherally-abutting relation with the ends of said spring, an intermediate member mounted for coaxial rotational movement relative to said drum adjacent the open end of said pocket, means providing a lost-motion, rotational driving connection between said hub and said intermediate member, and means carried by said intermediate member, projecting into said pocket, and operatively engaging said spring at a point in the length of said cylindrical spiral substantially midway between the ends of said cylindrical spiral.

2. In a device of the class described, a stationary drum, a continuous spring wound on the external surface of said drum as a substantially cylindrical spiral, a hub mounted for rotation about the axis of said drum and having an internal surface closely surrounding said spring, said surface being interrupted by a pocket having an angular extent of less than 180° and an axial depth slightly greater than one-half the length of said cylindrical spiral, means moving with said hub and disposed in peripherally-abutting relation with the ends of said spring, an intermediate member mounted for coaxial rotational movement relative to said drum adjacent the open end of said pocket, means providing a lost-motion, rotational driving connection between said hub and said intermediate member, said spring being formed to define, at a point substantially midway between the ends of said cylindrical spiral, a loop offset radially beyond said spiral, on an axis substantially parallel with the axis of said drum, and projecting into said pocket, and means carried by said intermediate member, projecting into said pocket and firmly engaged in said loop to provide a driving connection between said intermediate member and the intermediate portion of said spring.

3. A steering aid for vehicles comprising a drum, means for mounting said drum fixedly on a vehicle in substantial axial alignment with the steering post of the vehicle, shell means adapted for mounting on such a steering post in non-rotational relation thereto and having a portion overlapping said drum exteriorly thereof, a coiled spring sleeved on said drum, means providing a driving connection between the overlapping portion of said shell means and a point on said spring substantially midway between the ends thereof, a manually-manipulable steering element supported for rotation about the axis of said drum, means providing a lost-motion, rotational driving connection between said steering element and said shell means, and means moving with said steering element and disposed in peripherally-abutting relation with the ends of said spring, whereby rotational movement of said steering element relative to said shell means in one direction or the other causes said means moving with said steering element to shift an end of said spring to tend to unwrap the adjacent portion of said spring from said drum, and subsequent movement of said shell means in the same direction tends to unwrap the remainder of said spring from said drum.

4. A steering aid attachment for an automotive vehicle having a steering post, comprising a bracket formed to provide a sleeve, means for securing said bracket to said vehicle with its sleeve in concentric association with the vehicle steering post, a drum, means for securing said drum to said bracket sleeve to surround the upper portion of the vehicle steering post, a hub sleeved on, and having a journal bearing on the external surface of, said drum, spring means comprising a first helical portion and a second helical portion in axial alignment sleeved on said drum, the internal diameter of said spring means, when in equilibrium, being slightly less than the external diameter of said drum, mandrel means, means for securing said mandrel means to the upper end of such a steering post, said mandrel means having a portion received in, and having a journal bearing upon the internal surface of, said drum and having a portion projecting radially beyond said drum, said last-named portion overlying the outer end of said spring means, means moving with said radially-projecting mandrel portion and operatively engaging said spring means at a point intermediate the remote end of the latter, means moving with said hub and operatively engaging the remote ends of said spring means, and means providing a lost-motion, peripherally-effective driving connection between said hub and said mandrel, said hub surrounding and housing said spring means and the radially-projecting portion of said mandrel.

5. The device of claim 4 in which said hub is formed to provide a substantially cylindrical internal surface having a peripheral extent exceeding 180°, such surface closely circumscribing said spring means substantially from end to end thereof to restrict radial expansion of said spring means.

6. A steering aid attachment for an automotive vehicle having a steering post, comprising a bracket formed to provide a sleeve, means for securing said bracket to said vehicle with its sleeve in concentric association with the vehicle steering post, an open-ended, tubular drum, means for removably securing the proximal end of said drum telescopically to said bracket sleeve with said drum surrounding a distal portion of the vehicle steering post in radially-spaced, concentric relation thereto, a hub sleeved on said drum and having, adjacent its proximal end, a journal bearing on the external surface of said drum near the proximal end of said drum, the distal end of said hub being open, spring means comprising a first helical portion and a second helical portion in axial alignment sleeved on said drum within said hub, the internal diameter of said spring means, when in equilibrium, being slightly less than the external diameter of said drum, mandrel means having a portion received in, and having a journal bearing upon the internal surface of, said drum, means for connecting said mandrel means to the distal end of such a steering post for rotation therewith, said mandrel means having, at its distal end, a flange portion projecting radially beyond said drum and past the distal end of said spring means, means moving with said radially-projecting mandrel portion and operatively engaging said spring means at a point intermediate the first and second portions of the latter, means moving with said hub and operatively engaging the remote ends of said spring means, and removable means closing the open end of said hub, rotationally fixed to said hub and providing a lost-motion, peripherally-effective driving connection between said hub and said mandrel means, said last-named means cooperating with said hub to house and enclose said spring means and said mandrel means.

7. The device of claim 6 in which said hub is formed to provide a substantially cylindrical internal surface having a peripheral extent exceeding 180°, such surface closely circumscribing said spring means substantially from end to end thereof to restrict radial expansion of said spring means.

8. The device of claim 6 in which said means for connecting said mandrel means to said steering post is rendered accessible upon removal of said removable means.

9. A steering aid assembly for substitution for the conventional steering wheel of an automotive vehicle having a steering post, said assembly comprising a substantially cylindrical, tubular drum, a steering wheel having a hollow, open-ended hub, the major portion of the length of said drum being disposed within said hub and said hub having, adjacent one end, a substantially liquid-tight journal bearing on the external surface of said drum, spring means comprising a first helical portion and a second helical portion in axial alignment sleeved on said drum within said hub, mandrel means having a portion received in, and having adjacent one end, a substantially liquid-tight journal bearing on the internal surface of said drum axially-adjacent the bearing of said hub on said drum, means for connecting said mandrel means to such a steering post for coaxial rotation therewith, said mandrel means having, adjacent its opposite end, a flange portion located axially outside said drum but within said hub and projecting radially beyond the external periphery of said spring means, means moving with said radially-projecting mandrel portion and operatively engaging said spring means intermediate the first and second portions thereof, means moving with said hub and operatively engaging the remote ends of said spring means, a removable closure for the other end of said hub having a substantially liquid-tight engagement with said hub, means providing a lost-motion, peripherally-effective driving connection between said hub and said mandrel means, and means for securing said drum non-rotationally to such a vehicle in substantially concentric relation to the steering post thereof.

10. The device of claim 9 in which said hub is formed to provide a substantially cylindrical internal surface having an extent exceeding 180°, such surface closely circumscribing said spring means from end to end thereof to restrict radial expansion of said spring means.

References Cited in the file of this patent

UNITED STATES PATENTS

| | | |
|---|---|---|
| 787,788 | Pinard | Apr. 18, 1905 |
| 823,971 | Rémondy | June 19, 1906 |
| 1,997,646 | Miller | Apr. 16, 1935 |
| 2,598,142 | Smith | May 27, 1952 |